(12) United States Patent
So (10) Patent No.: US 7,771,072 B2
(45) Date of Patent: Aug. 10, 2010

(54) BACKLIGHT UNIT AND LIQUID CRYSTAL DISPLAY DEVICE HAVING THE SAME

(75) Inventor: Hyun Jin So, Seoul (KR)

(73) Assignee: LG Display Co., Ltd., Seoul (KR)

( * ) Notice: Subject to any disclaimer, the term of this patent is extended or adjusted under 35 U.S.C. 154(b) by 87 days.

(21) Appl. No.: 11/642,844

(22) Filed: Dec. 21, 2006

(65) Prior Publication Data
US 2007/0263136 A1 Nov. 15, 2007

(30) Foreign Application Priority Data
May 9, 2006 (KR) ........................ 10-2006-0041409

(51) Int. Cl.
*G09F 13/08* (2006.01)
(52) U.S. Cl. .................. 362/97.2; 362/29; 362/223; 362/224; 362/330; 362/385; 362/558; 362/561
(58) Field of Classification Search ................ 362/603, 362/606–608, 29, 223, 224, 617, 619–621, 362/330, 385, 511, 551, 561, 615, 97.2, 558
See application file for complete search history.

(56) References Cited

U.S. PATENT DOCUMENTS

| 7,581,845 | B2* | 9/2009 | Lee ............................. 362/97.2 |
| 2002/0021564 | A1* | 2/2002 | Cho et al. ..................... 362/97 |
| 2003/0058635 | A1* | 3/2003 | Matsui ......................... 362/97 |
| 2003/0112626 | A1* | 6/2003 | Yoo et al. .................... 362/225 |
| 2005/0129357 | A1* | 6/2005 | Yang et al. ..................... 385/31 |
| 2006/0056166 | A1* | 3/2006 | Yeo et al. ....................... 362/19 |
| 2007/0002589 | A1* | 1/2007 | Sung et al. ................... 362/630 |

FOREIGN PATENT DOCUMENTS

CN 2588411 Y 11/2003

* cited by examiner

*Primary Examiner*—Sandra L O'Shea
*Assistant Examiner*—Mary Zettl
(74) *Attorney, Agent, or Firm*—Morgan, Lewis & Bockius LLP

(57) ABSTRACT

A backlight unit and a display device using the same include a light-guiding plate having a plurality of grooves, a plurality of light-emitting lamps in the respective grooves of the light-guiding plate, and a light-diffusion sheet above the light-guiding plate and the lamps.

8 Claims, 6 Drawing Sheets

BACKLIGHT UNIT AND LIQUID CRYSTAL
DISPLAY DEVICE HAVING THE SAME

The invention claims the benefit of Korean Patent Application No. P2006-041409 filed in Korea on May 9, 2006, which is hereby incorporated by reference in its entirety.

BACKGROUND OF THE INVENTION

1. Field of the Invention

Embodiments of the invention relates to a display device, and more particularly, to a backlight unit and a display device having the same. Although embodiments of the invention are suitable for a wide scope of applications, they are particularly suitable for providing a backlight unit for a large-sized liquid crystal display device.

2. Discussion of the Related Art

A cathode ray tube ("CRT") has been widely used for monitors of a television, a measuring machine and an information terminal. However, a CRT is bulky and heavy. Thus, various display devices, for example, a liquid crystal display ("LCD") device using an electric field optical effect, a plasma display panel ("PDP") using a gas discharge and an electroluminescence display ("ELD") device using an electric field luminous effect, have been studied to substitute the CRT. Among the various display devices, LCD devices have been most actively studied. LCD devices have advantageous characteristics, such as compact size, lightness and low power consumption, and are suitable as flat display devices, for example, monitors for spacecrafts, aircrafts, notebook computers, laptop computers, desktop computers and large-sized display devices. Thus, the demand for the LCD devices is in the continuous increase.

In general, LCD devices control light transmittance from ambient light, to thereby display images, and requires a separate light source, such as a backlight unit. A backlight unit used as the light source of an LCD device commonly has a cylindrical light-emitting lamp, and the backlight unit is classified into a direct type and an edge type based on the arrangement of the light-emitting lamps.

In the edge type backlight unit, a lamp unit is provided at one side of a light-guiding plate, and the lamp unit has one lamp for emitting light. A lamp holder is inserted into both ends of the lamp to protect the lamp, and a reflective sheet, which has one side inserted to the light-guiding plate and surrounding the circumference of the lamp, reflects the light emitted from the lamp to the light-guiding plate. The edge type backlight unit is generally applied to relatively small sized LCD devices for the monitors of the laptop computer and the desktop computer. The edge type backlight unit is advantageous in that it has great uniformity of light, long life span, and thin profile of the LCD device. However, the edge type backlight unit has the low uniformity of light when the edge type backlight unit is used as the light source of the large-sized LCD device.

With trend of the large-sized LCD device of 20-inch or more, the direct type backlight unit is actively developed. In the direct type backlight unit, a plurality of lamps are formed along one line on a lower surface of a light-diffusion sheet, whereby the entire surface of the LCD panel is directly illuminated with the light emitted from the lamps. The direct type backlight unit has greater light efficiency as compared with the edge type backlight unit. Thus, the direct type backlight unit is used for the large-sized LCD device requiring high luminance, and the LCD device having the direct type backlight unit is generally used for the large-sized monitor or television. However, with the direct type backlight unit, it is difficult to obtain the thin profile of the LCD device since the plurality of lamps are directly provided on the light-diffusion sheet.

Figure 1:
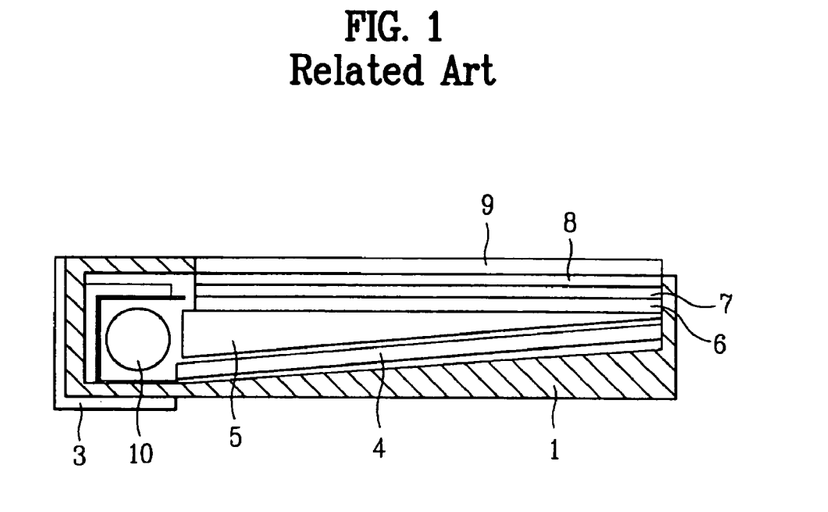
FIG. 1 is a cross-sectional view illustrating a backlight unit according to the related art.
Figure 2A:
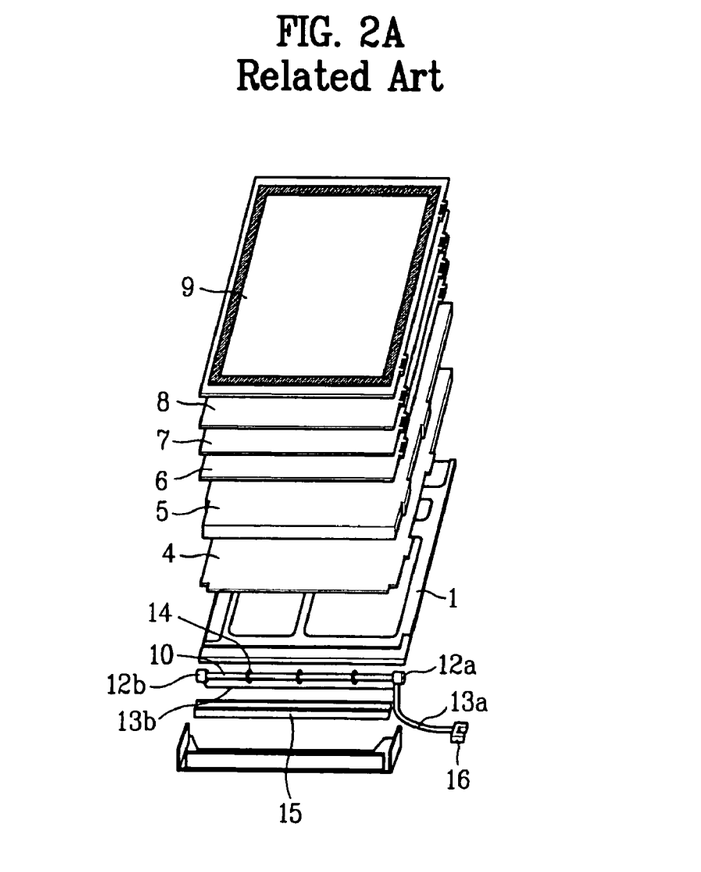
FIG. 2A is an exploded perspective view illustrating a backlight unit according to the related art.
Figure 2B:
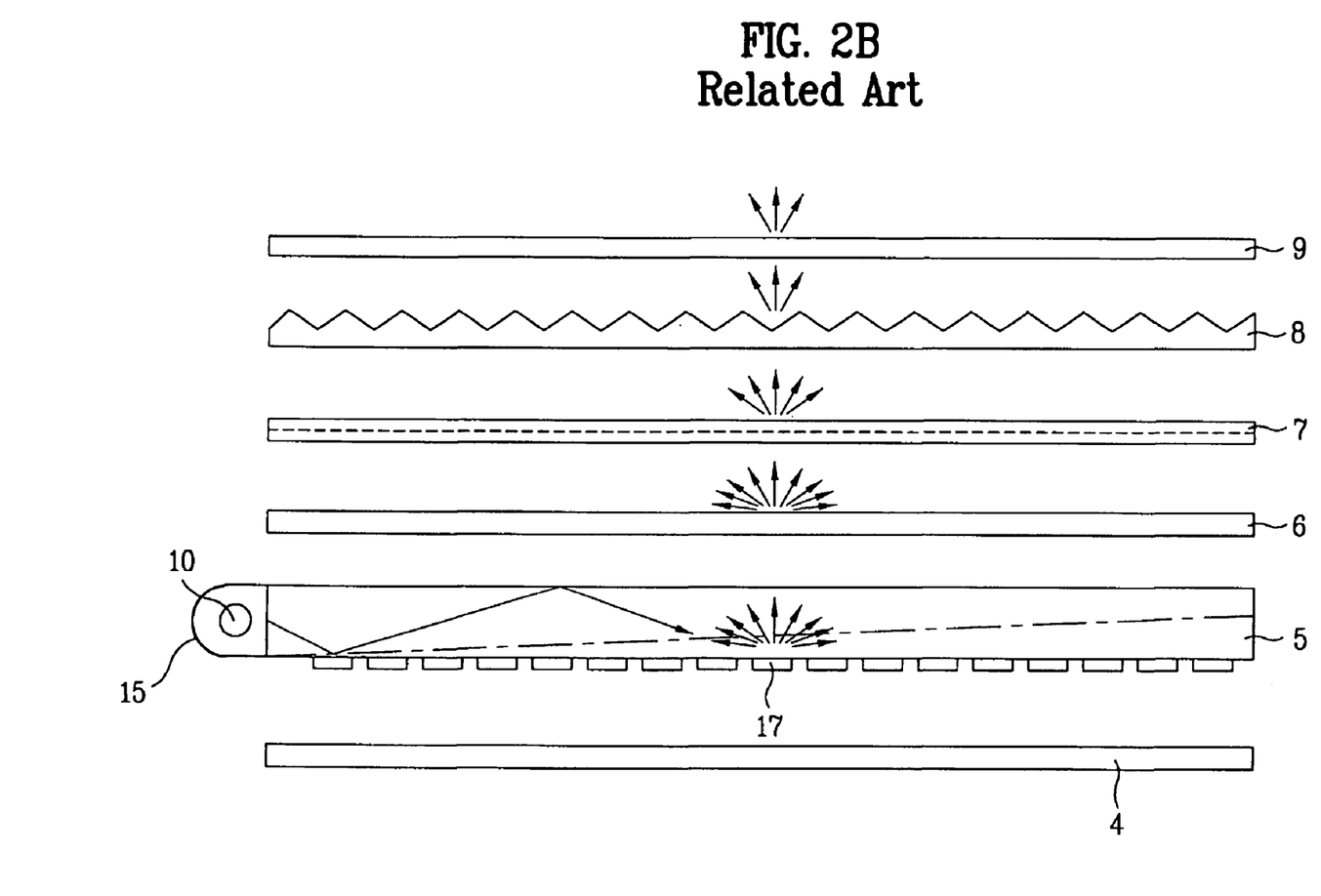
FIG. 2B is an exploded cross-sectional view illustrating a backlight unit according to the related art.

FIG. 1 is a cross-sectional view illustrating a backlight unit according to the related art, FIG. 2A is an exploded perspective view illustrating a backlight unit according to the related art, and FIG. 2B is an exploded cross-sectional view illustrating a backlight unit according to the related art. FIGS. 2A and 2B show one example of an edge type backlight unit to convert a line-type light source into a surface-type light source. In FIG. 1, the related art backlight unit includes a main supporter 1 which supports respective components, and a lower cover 3 which protects a lateral side of the main supporter 1 and a lower surface adjacent to the lateral side of the main supporter 1. The backlight unit also includes a light-guiding plate 5 which guides light emitted from a lamp 10 to an LCD panel (not shown). The lamp 10 is provide at an incidence surface corresponding to one side of the light-guiding plate 5, and a lamp assembly accommodates the lamp 10. The backlight further includes lower and upper light-diffusion sheets 6 and 9, which are provided on an upper surface of the light-guiding plate 5 to diffuse the light guided by the light-guiding plate 5, and lower and upper prism sheets 7 and 8, which concentrate the light diffused by the lower and upper light-diffusion sheets 6 and 9 and transmit the concentrated light to the LCD panel (not shown). The lamp 10 is a cold cathode fluorescent lamp ("CCFL"), which generates visible rays according to a high voltage applied from an inverter.

As shown in FIGS. 2A and 2B, a high-voltage lamp wire 13a and a low-voltage lamp wire 13b are connected with a connector 16, and are also respectively inserted into a high-voltage lamp holder 12a and a low-voltage lamp holder 12b. After the lamp wires 13a and 13b are soldered on the high-voltage and low-voltage lamp holders 12a and 12b, the lamp holders 12a and 12b are put into a lamp housing. Thus, the soldering portions of the lamp are covered with the lamp holders 12a and 12b, thereby completing the lamp assembly.

Then, the lamp assembly is assembled into the main supporter 1, and the lower cover 3 is provided to the incidence side of the main supporter 1 to protect the lamp assembly from the external force. After that, the reflective sheet 4 is provided on an inner bottom of the main supporter 1, the light-guiding plate 5 is provided around the inner gap of the lamp housing 15 in consideration for the gap size and the flatness of the lamp housing 15.

The lower light-diffusion sheet 6, the lower prism sheet 7, and the upper prism sheet 8 and the upper light-diffusion sheet 9 are provided above the light-guiding plate 5 in sequence. In the above-mentioned backlight unit according to the related art, power is applied to the lamp through the use of connector connected with a power supply, such that the lamp emits light by a glow discharge. As light emitted from the lamp is incident on the incidence surface of the light-guiding plate 5, light then is reflected on and diffused by printing dots 17 provided on the lower surface of the light-guiding plate 5. Then, the diffused light is concentrated to a vertical direction through the use of lower and upper prism sheets 8 and 7, and is then slantingly diffused through the light-diffusion sheets 6 and 9. The reflective sheet 4 reflects the light, which leaks to the rear surface without being reflected and diffused on the printing dots 17, to the upper direction.

Then, the rear of the LCD panel is illuminated with the predetermined amount of light through the upper light-diffusion sheet 9. Since the main purpose of the upper light-diffusion sheet 9 is to protect the upper prism sheet 8, the upper light-diffusion sheet 9 may be referred to as a protection film. If using the backlight unit for a monitor, the light-diffusion sheet and a double brightness enhanced film ("DBEF") are integrated into one, to thereby obtain a wide viewing angle.

The edge type backlight unit according to the related art has the following disadvantages. The related art edge type backlight unit is generally applied to the small-sized LCD device, for example, the monitors for the laptop and desktop computers. If the edge type backlight unit is applied to the large-sized LCD device, it is difficult to obtain the uniform brightness on the entire surface of the LCD panel. In addition, since the lamp is provided at one side of the backlight unit and the light emitted from the lamp is required to pass through the light-guiding plate, it is difficult to obtain the high brightness.

The edge type backlight unit according to the related art is provided with the lower and upper light-diffusion sheets and the lower and upper prism sheets above the light-guiding plate. Thus, the edge type backlight unit according to the related art is increased in thickness. Further, if integrating the upper light-diffusion sheet with the DBEF, the price competition is lowered due to the expensive DBEF.

SUMMARY OF THE INVENTION

Accordingly, embodiments of the invention is directed to a backlight unit and a liquid crystal display device having the same that substantially obviate one or more of the problems due to limitations and disadvantages of the related art.

An object of embodiments of the invention is to provide a backlight unit and a liquid crystal display device having the same that improve uniformity of brightness.

Another object of embodiments of the invention is to provide a backlight unit and a liquid crystal display device having the same that decrease fabrication cost.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a backlight unit includes a light-guiding plate having a plurality of grooves, a plurality of light-emitting lamps in the respective grooves of the light-guiding plate, and a light-diffusion sheet above the light-guiding plate and the lamps.

In another aspect, a liquid crystal display device includes an LCD panel including upper and lower substrates, and a liquid crystal layer between the upper and lower substrates; and a backlight unit including a light-guiding plate with a plurality of grooves, a plurality of light-emitting lamps in the grooves of the light-guiding plate, and a light-diffusion sheet above the light-guiding plate and the lamps.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 3:
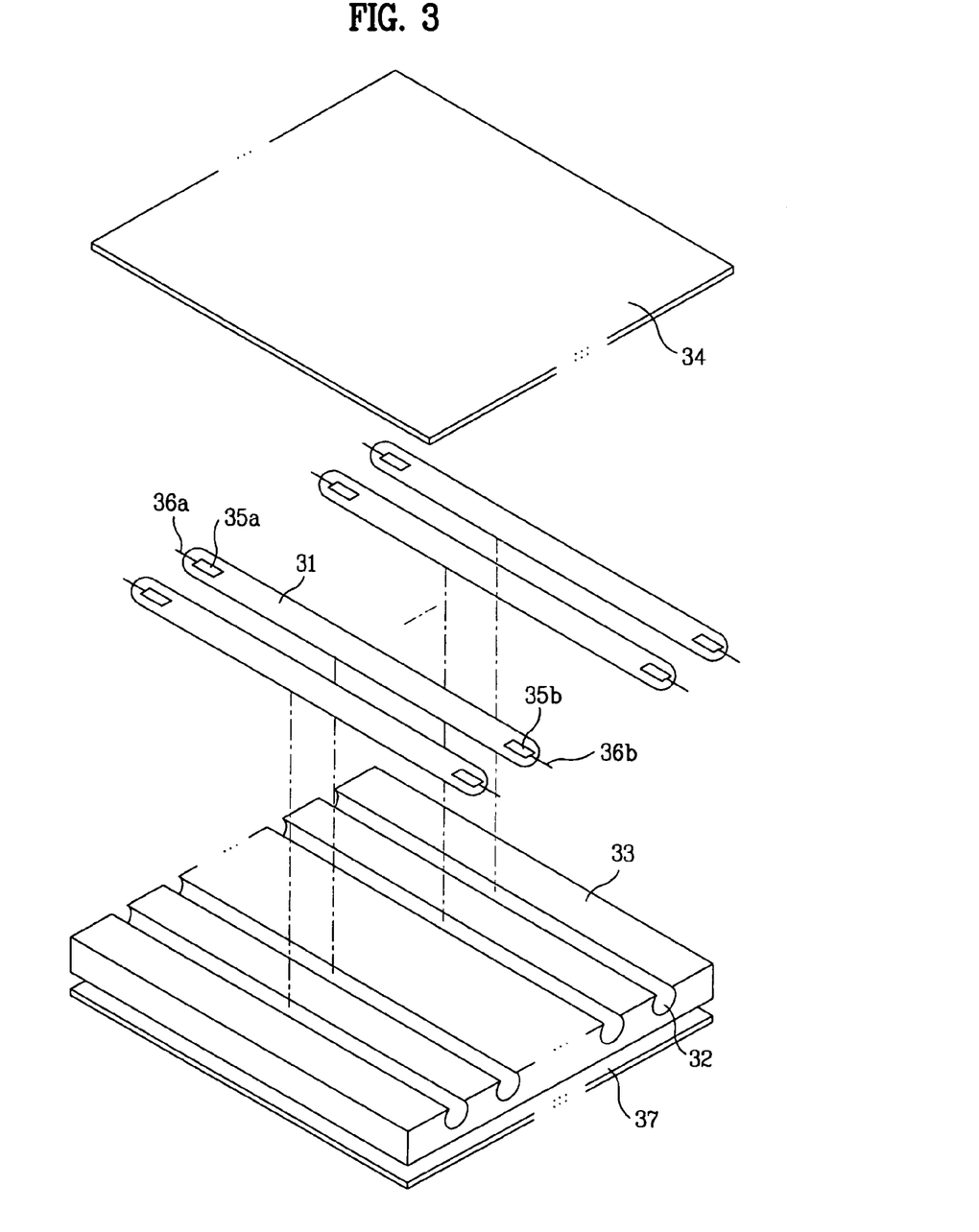
FIG. 3 is an exploded perspective view illustrating a backlight unit according to an embodiment of the invention.
Figure 4:
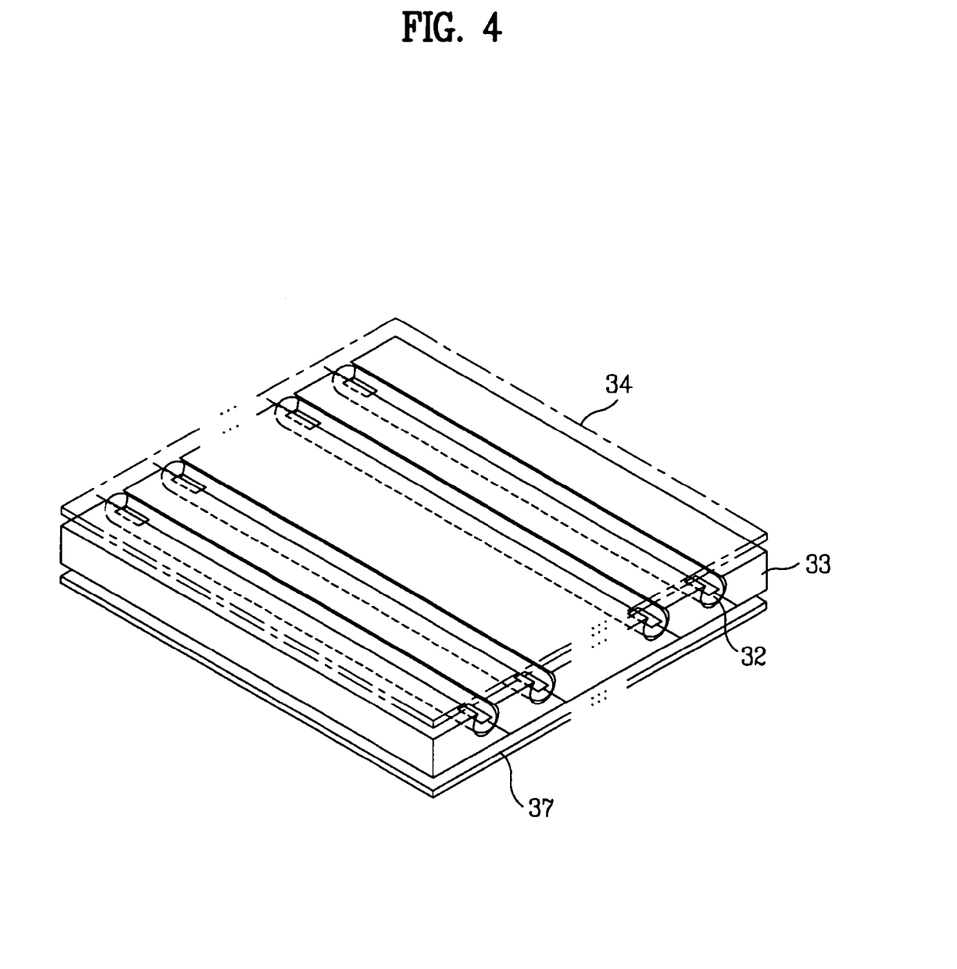
FIG. 4 is a perspective view illustrating the backlight unit shown in FIG. 3 after an assembling process.

FIG. 3 is an exploded perspective view illustrating a backlight unit according to an embodiment of the invention, and FIG. 4 is a perspective view illustrating the backlight unit shown in FIG. 3 after an assembling process. In FIGS. 3 and 4, a backlight unit includes a plurality of light-emitting lamps 31, a light-guiding plate 33, a light-diffusion sheet 34 and a reflective sheet 37. The light-guiding plate 33 includes a plurality of grooves 32 holding the lamps 31 therein and guides light emitted from the lamps 31 onto a liquid crystal display panel (not shown). In particular, the plurality of light-emitting lamps 31 are arranged along one direction and are respectively positioned in the grooves 32 of the light-guiding plate 33. The light-diffusion sheet 34 transmits light emitted from the lamps 31 and guided by the light-guiding plate 33 to an LCD panel (not shown). In addition, the reflective sheet 37 is provided under the light-guiding plate 33.

The light-emitting lamps 31 may be cold cathode fluorescent lamps ("CCFLs"). When CCFLs are employed, a fluorescent discharge tube is provided for a penning effect, wherein the fluorescent discharge tube may be formed by injecting hydrargyrum gas containing argon (Ar) and neon (Ne) into the tube at a low temperature. Each CCFL includes first and second electrodes 35a and 35b formed at both ends of a tube, and first and second power-supplying lines 36a and 36b connected to the first and second electrodes 35a and 35b to transmit a voltage of driving the lamp to the first and second electrodes 35a and 35b. The first and second power-supplying lines 36a and 36b may be connected to a driving circuit by an additional connector (not shown).

As the voltage is applied to the first and second electrodes 35a and 35b of the CCFL 31 through the first and second power-supplying lines 36a and 36b, electric charges positioned inside the lamp 31 are moved to the anode, and the moving electric charges collide against Ar/Ne, whereby positive ions are generated by the excited Ar/Ne. Then, the generated positive ions collide against the cathode, thereby generating secondary electrons.

As the above-mentioned secondary electrons are discharged through the tube, the flow of electrons is ionized by the collision against the hydrargyrum gas so that ultraviolet rays are emitted therefrom. Thus, the emitted ultraviolet rays excite the fluorescent substance coated onto the inner surface of the lamp, thereby emitting visible rays.

The light-guiding plate 33 may function as a waveguide to guide light emitted from the lamps 31 to the upper side. The light-guiding plate 33 may be formed of acrylic resin having high light transmittance, for example, poly methyl meth acrylate ("PMMA"). In addition, the plurality of grooves 32 may be provided in the light-guiding plate 33 at fixed intervals, and the plurality of lamps 31 are respectively inserted into the grooves 32 formed in the light-guiding plate 33.

Thus, a backlight unit and a display device having the same according to an embodiment of the invention include a plurality of lamps as light sources. For example, a plurality of lamps respectively positioned in grooves of a high reflective light-guiding plate may be employed as light sources. In comparison with the backlight unit according to the related art having one or two light sources at one side or both sides thereof, a backlight unit and a liquid crystal display device having the same according to an embodiment of the invention obtain high brightness with easiness, and have uniform brightness. In addition, by providing the plurality of lamps into the grooves of the light-guiding plate, the absolute contrast ratio of the backlight unit increases. Thus, the backlight unit according to an embodiment of the invention can be fabricated with one light-diffusion sheet 34 instead of an expensive DBEF sheet.

Moreover, a backlight unit according to an embodiment of the invention requires a fewer number of lamps in comparison with that of the general direct type backlight unit, while not lowering the overall brightness. The brightness generated by the backlight unit according to an embodiment of the invention is not lowered since the lamps being inserted into the grooves of the light-guiding plate, which effectively guides light onto the display panel.

Figure 5:
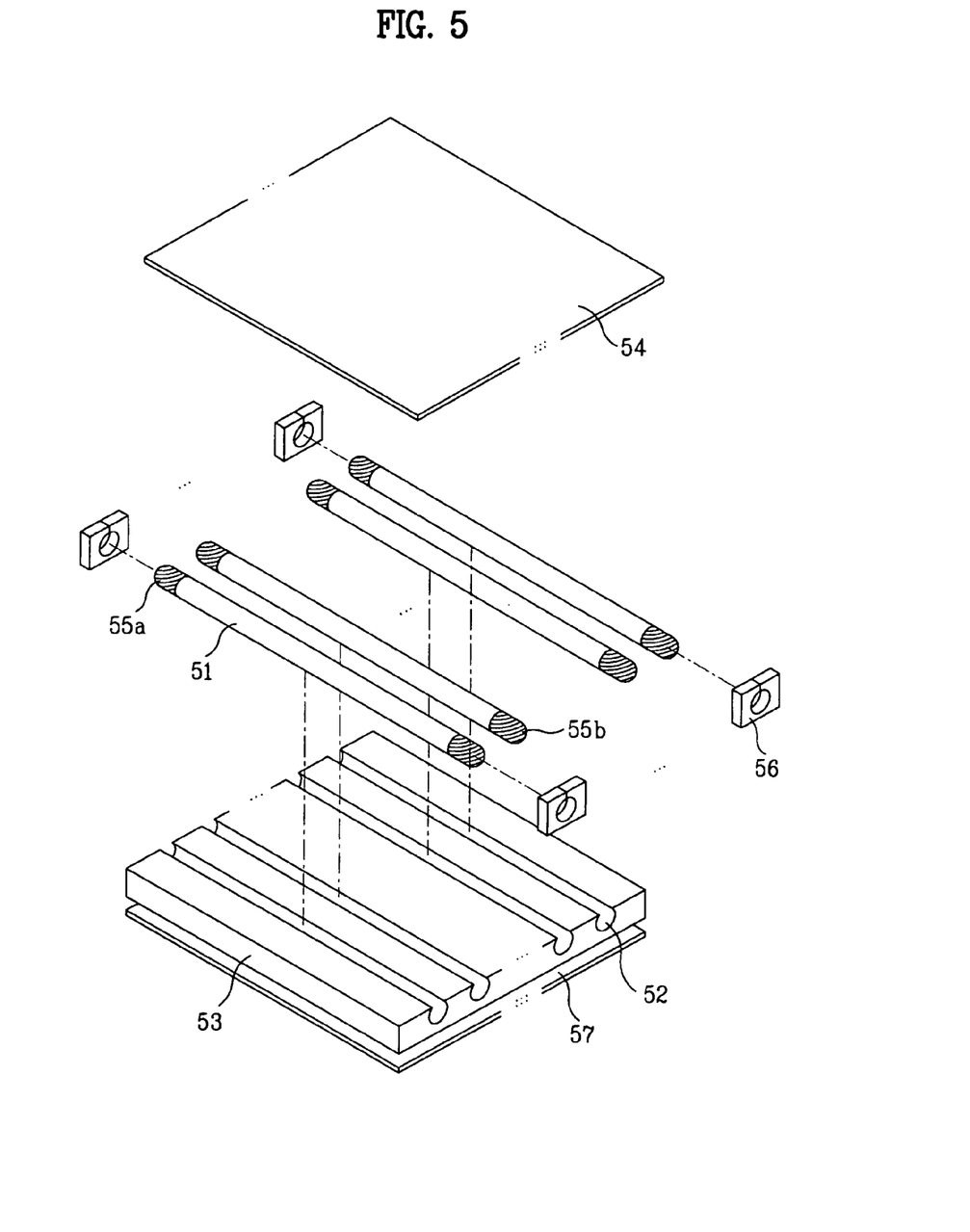
FIG. 5 is an exploded perspective view illustrating a backlight unit according to another embodiment of the invention.

FIG. 5 is an exploded perspective view illustrating a backlight unit according to another embodiment of the invention. In FIG. 5, a backlight unit includes a plurality of light-emitting lamps 51, a light-guiding plate 53, a light-diffusion sheet 54 and a reflective sheet 57. The light-guiding plate 53 includes a plurality of grooves 52 holding the lamps 51 therein and guides light emitted from the lamps 51 onto a liquid crystal display panel (not shown). In particular, the plurality of light-emitting lamps 51 are arranged along one direction and are respectively positioned in the grooves 52 of the light-guiding plate 53. The light-diffusion sheet 54 transmits light emitted from the lamps 51 and guided by the light-guiding plate 53 to an LCD panel (not shown). In addition, the reflective sheet 57 is provided under the light-guiding plate 53.

The light-emitting lamps 51 may be external electrode fluorescent lamps ("EEFLs"). When EEFLs are employed, each EEFL has two protruding ends corresponding to first and second external electrodes 55a and 55b. Lamp holder 56 may be employed to fix the protruding ends of the lamp 51. As shown in FIG. 5, the lamp holder 56 may be provided to fix each end of the lamp 51, or may be provided along a longitudinal direction of the lamp 51 to fix the both ends of the lamp 51. The lamp holder 56 may have an opening in a shape corresponding to the shape of the ends of the lamp 51. The structure of the lamp holder 56 is not limited to the shape shown in FIG. 5 and may have a variable shape. In addition, although not shown, the first external electrodes 55a of the lamps 51 may be electrically connected to one another, and the second external electrodes 55b of the lamps 51 may be electrically connected to one another.

The light-guiding plate 53 may function as a waveguide to guide light emitted from the lamps 51 to the upper side. The light-guiding plate 33 may be formed of acrylic resin having high light transmittance, for example, poly methyl meth acrylate ("PMMA"). In addition, the plurality of grooves 52 may be provided in the light-guiding plate 33 at fixed intervals, and the plurality of lamps 51 are respectively inserted into the grooves 52 formed in the light-guiding plate 53. The light-guiding plate 53 also may include an opening to hold the lamp holder 56.

Thus, a backlight unit and a display device having the same according to an embodiment of the invention include a plurality of lamps as light sources. For example, a plurality of lamps respectively positioned in grooves of a high reflective light-guiding plate may be employed as light sources. In comparison with the backlight unit according to the related art having one or two light sources at one side or both sides thereof, a backlight unit and a liquid crystal display device having the same according to an embodiment of the invention obtain high brightness with easiness, and have uniform brightness. In addition, by providing the plurality of lamps into the grooves of the light-guiding plate, the absolute contrast ratio of the backlight unit increases. Thus, the backlight unit according to an embodiment of the invention can be fabricated with one light-diffusion sheet 34 instead of the expensive DBEF sheet.

Moreover, a backlight unit according to an embodiment of the invention requires a fewer number of lamps in comparison with that of the general direct type backlight unit, while not lowering the overall brightness. The brightness generated by the backlight unit according to an embodiment of the invention is not lowered since the lamps being inserted into the grooves of the light-guiding plate, which effectively guides light onto the display panel.

The backlight unit according to an embodiment of the invention may be used as the light source in display devices, for example, monitors, notebook PCs, and televisions, and the backlight unit may be provided at the front or rear of the display devices.

Figure 6:
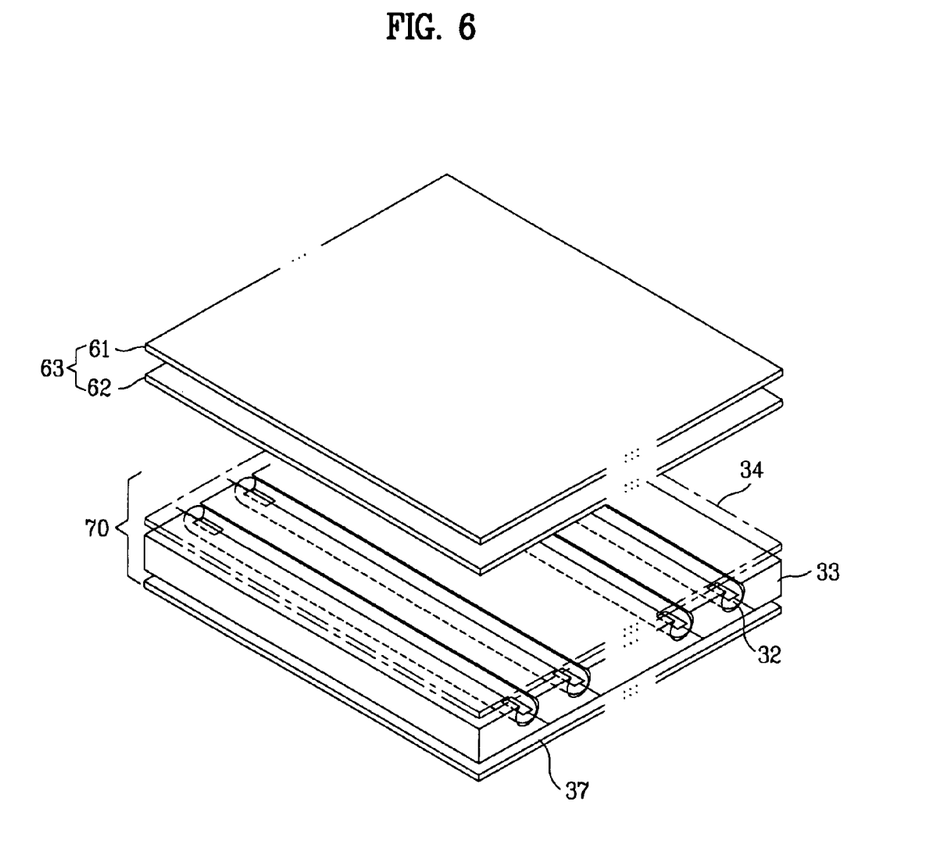
FIG. 6 is a perspective view of an LCD device including a backlight unit according to an embodiment of the invention.

FIG. 6 is a perspective view of an LCD device including a backlight unit according to an embodiment of the invention. As shown in FIG. 6, an LCD device includes an LCD panel 63 and a backlight unit 70. The LCD panel 63 includes upper and lower substrates 61 and 62 and a liquid crystal layer between the substrates 61 and 62 (not shown). The backlight unit 70 includes a plurality of lamps as light sources. The backlight unit 70 may have the same arrangement as the backlight unit shown in FIG. 4 or 5.

Although not shown, the lower substrate 62, which may be referred to as a TFT array substrate, is provided with a plurality of gate lines, a plurality of data lines, a plurality of pixel electrodes arranged in respective pixel regions defined by the gate and data lines crossing each other, and a plurality of thin film transistors. The pixel regions are in a matrix configuration, and the thin film transistors are switched in accordance with signals applied to the gate lines, to thereby transmit signals applied to the data lines to the respective pixel electrodes.

Further, although not shown, the upper substrate 61, which may be referred to as a color filter array substrate, is provided with a black matrix layer to prevent the leakage of light on the other portions except the pixel regions, an R/G/B color filter layer to display color images, and a common electrode to realize images. In case of an in-plane switching ("IPS") mode LCD device, a common electrode is formed on the lower substrate. Moreover, the common electrode and the pixel electrode, provided on the upper and lower substrates 61 and 62, are formed of transparent and conductive materials having high light transmittance, for example, indium tin oxide ("ITO").

Accordingly, a backlight unit and a display device having the same according to an embodiment of the invention have several advantages. First, a backlight unit and a display device having the same according to an embodiment of the invention include a plurality of lamps corresponding to the light sources. The lamps are provided in the grooves of a light-guiding plate, thereby improving the entire brightness.

In addition, as the plurality of lamps corresponding to the light sources are provided in the grooves of the light-guiding plate, the contrast ratio is increased. Thus, it is unnecessary to provide the expensive light-diffusion sheet such as DBEF, thereby decreasing the fabrication cost. Moreover, since the plurality of lamps are arranged in the light-guiding plate at fixed intervals, the uniformity of brightness is improved. The backlight unit according to an embodiment of the invention may be used as the light source in display devices, for example, monitors, notebook PCs, and televisions, and the backlight unit may be provided at the front or rear of the display devices.

It will be apparent to those skilled in the art that various modifications and variations can be made in the backlight unit and the display device having the same of embodiments of the invention without departing from the spirit or scope of the invention. Thus, it is intended that embodiments of the invention cover the modifications and variations of this invention provided they come within the scope of the appended claims and their equivalents.

What is claimed is:

1. A backlight unit, comprising:
   a light-guiding plate having a plurality of grooves, wherein an opening portion of the grooves is formed on the upper portion of the light-guiding plate and a width of the grooves is formed to be gradually narrower as it goes from a central portion of the grooves to the opening portion of the grooves;
   a plurality of light-emitting lamps in the respective grooves of the light-guiding plate, wherein each of the lamps includes an external electrode fluorescent lamp having first and second external electrodes at both external ends of a tube;
   lamp holders affixing the first and second external electrodes provided at the both external ends of the tube, wherein an entire circumference of the first and second external electrodes is enclosed by the lamp holders and each of the first and second external electrodes corresponds one-on-one with a lamp holder; and
   a light-diffusion sheet above the light-guiding plate and the lamps.

2. The backlight unit of claim 1, wherein the light-guiding plate includes acrylic resin.

3. The backlight unit of claim 1, further comprising a reflective sheet under the light-guiding plate.

4. The backlight unit of claim 1, wherein the light-diffusion sheet is composed of one sheet.

5. A liquid crystal display device, comprising:
   an LCD panel including upper and lower substrates, and a liquid crystal layer between the upper and lower substrates; and
   a backlight unit including a light-guiding plate with a plurality of grooves, a plurality of light-emitting lamps in the grooves of the light-guiding plate and including an external electrode fluorescent lamp having first and second external electrodes at both external ends of a tube, lamp holders affixing the first and second external electrodes provided at the both external ends of the tube, and a light-diffusion sheet above the light-guiding plate and the lamps;
   wherein an opening portion of the grooves is formed on the upper portion of the light- guiding plate and a width of the grooves is formed to be gradually narrower as it goes from a central portion of the grooves to the opening portion of the grooves; and
   wherein an entire circumference of the first and second external electrodes is enclosed by the lamp holders and each of the first and second external electrodes corresponds one-on-one with a lamp holder.

6. The device of claim 5, wherein the light-guiding plate includes acrylic resin.

7. The device of claim 5, further comprising a reflective sheet under the light-guiding plate.

8. The device of claim 5, wherein the light-diffusion sheet is composed of one sheet.

* * * * *